United States Patent
Milon et al.

(10) Patent No.: US 12,154,000 B2
(45) Date of Patent: Nov. 26, 2024

(54) DEVICE FOR COUNTING OBJECTS

(71) Applicant: ECO COMPTEUR, Lannion (FR)

(72) Inventors: Christophe Milon, Lannion (FR); Mathieu Rougeolle, Ploubezre (FR)

(73) Assignee: ECO COMPTEUR, Lannion (FR)

(*) Notice: Subject to any disclaimer, the term of this patent is extended or adjusted under 35 U.S.C. 154(b) by 44 days.

(21) Appl. No.: 18/248,962

(22) PCT Filed: Sep. 22, 2021

(86) PCT No.: PCT/EP2021/076108
§ 371 (c)(1),
(2) Date: Apr. 13, 2023

(87) PCT Pub. No.: WO2022/078723
PCT Pub. Date: Apr. 21, 2022

(65) Prior Publication Data
US 2023/0385595 A1 Nov. 30, 2023

(30) Foreign Application Priority Data
Oct. 16, 2020 (FR) ........................................ 2010618

(51) Int. Cl.
G06M 1/10 (2006.01)
G06M 11/00 (2006.01)

(52) U.S. Cl.
CPC ............ *G06M 1/101* (2013.01); *G06M 11/00* (2013.01)

(58) Field of Classification Search
None
See application file for complete search history.

(56) References Cited

U.S. PATENT DOCUMENTS

| | | | |
|---|---|---|---|
| 3,792,275 A | 2/1974 | Leftwich et al. | |
| 2009/0105563 A1* | 4/2009 | Yajima | A61B 5/15134 606/12 |
| 2009/0166538 A1 | 7/2009 | Buckley et al. | |

FOREIGN PATENT DOCUMENTS

| | | |
|---|---|---|
| FR | 2899003 A1 | 9/2007 |
| WO | 9722089 A1 | 6/1997 |

OTHER PUBLICATIONS

International Search Report issued on Nov. 8, 2021, in corresponding International Patent Application No. PCT/EP2021/076108, 5 pages.
Search Report issued Jul. 12, 2021, in corresponding French Application No. 2010618, 2 pages.

* cited by examiner

*Primary Examiner* — Cassandra F Cox
(74) *Attorney, Agent, or Firm* — Maier & Maier, PLLC

(57) ABSTRACT

A counting device including a wall that delimits an internal space; an object counter that is positioned in the internal space and includes a measuring lens, which optically delimits a detection zone outside the counting device. The wall of the counting device includes an aperture positioned in front of, preferably centered relative to, the measuring lens, the measuring lens and the aperture being arranged to transmit to the counter a flux emitted by the objects present in the detection zone.

15 Claims, 3 Drawing Sheets

DEVICE FOR COUNTING OBJECTS

FIELD

The present invention relates to a counting device in a passing place, preferably installed in the urban environment, for counting objects passing through a detection zone and/or detecting their sense of passage.

The field of the invention is preferably that of devices for detecting objects passing through a passing place, preferably, in an urban environment.

BACKGROUND

Counting devices for counting passers-by in an urban environment are known. These devices are functional but raise several problems, especially:
- vandalism, as these devices are within the reach of objects or people circulating in the street,
- fragility due to the measurement system used and/or the conditions of the external environment,
- attenuation of the signal used for the measurement, as the protection of this type of device is often to the detriment of quality of the signal measured.

One purpose of the invention is to remedy at least one of the aforementioned drawbacks.

Another purpose of the invention is to provide an object counting device
- less prone to vandalism, and/or
- more robust and resistant to the external environment, and/or
- more resistant to the urban environment without losing quality of the measurement signal.

SUMMARY

The invention makes it possible to achieve at least one of the above-mentioned purposes by means of a counting device comprising:
- a wall delimiting an internal volume,
- a means for counting objects positioned in said internal volume, said counting means comprising:
  - a measurement means arranged to record and/or detect a flux (preferably at least one wavelength between 5 and 12 micrometres) emitted towards said counting means by objects present in a detection zone, and
  - a measurement lens optically delimiting the detection zone outside said counting device, the lens preferably being assembled to the rest of the counting means through a tight junction protecting the measurement means from dust and/or moisture coming from outside the counting means, characterised in that the wall of the counting means comprises a window:
- comprising germanium, preferably being entirely comprised of germanium, and
- positioned in front of, preferably centred on, the measurement lens, preferably so as to form a housing between the lens and the window (this housing preferably being a closed space and preferably having the shape of a tube, the two ends of which are preferably closed by the window and by the lens respectively),
- preferably assembled to the rest of the wall through a tight junction protecting the counting means from dust and/or moisture coming from outside the wall, said measurement lens and said window being arranged to transmit the flux emitted by objects present in said detection zone to said counting means.

Thus, in one preferential embodiment of the invention, the external wall (comprising the window) tightly isolates the counting means (and the housing between the lens and the window) from insects and moisture located outside the counting device according to the invention, while ensuring good transmission of a flux at at least one wavelength of between 5 and 12 micrometres detected by a "passive" infrared sensor of the measurement means through the window comprising Germanium.

For the window, Germanium is the ideal material allowing
- good material strength and therefore good protection against damage and/or vandalism,
- good transmission of the light flux at at least one wavelength between 5 and 12 micrometres, even with a window having a great thickness, which further improves resistance to damage and vandalism.

The counting device according to the invention may comprise a smooth external surface without discontinuity between the window and its perimeter formed in said wall, such that the window is not depressed inwardly of the device with respect to an external surface of the wall. Thus, in one preferential embodiment of the invention, the possibility of being able to insert (especially by an act of deliberate degradation) objects or waste (chewing gum, cigarette butt, etc.) into a recess and which would obstruct passage of the flux to the measurement means is avoided.

The measurement lens of the counting device according to the invention may comprise germanium or polyethylene. Polyethylene has a good transmission of the light flux at at least one wavelength between 5 and 12 micrometres but is more fragile than Germanium: the measurement lens can be made of polyethylene (in comparison with the window) because the lens is more protected inside the device according to the invention in comparison with the window.

The window of the counting device according to the invention may comprise a protective coating positioned on a side of the window facing outside of said counting device.

The protective coating may comprise a carbonaceous material, preferably diamond like carbon.

The window of the counting device according to the invention may comprise, along the direction of propagation of said flux on the optical axis between the window and the measurement lens, a thickness greater than 1 millimetre and/or less than 25 millimetres.

The window of the counting device according to the invention may be a lens.

The counting device according to the invention may comprise a gap, in the direction of propagation of said flux on the optical axis between the window and the measurement lens, of at least 5 millimetres between the optical centre of the measurement lens and the window positioned in front of said measurement lens.

The counting device according to the invention may comprise hooking means arranged to attach the wall to a support.

The wall of the counting device according to the invention may form a post connected to a ground carrying said device.

The measurement lens, preferably its optical centre, of the counting device according to the invention may be positioned at a distance from the ground surface greater than 500 millimetres and/or less than 1000 millimetres, preferably between 700 and 850 millimetres.

The measurement lens of the counting device according to the invention may be held in a means for holding the counting means, said holding means comprising at least a first flange which is in contact with said window.

The measurement lens of the counting device according to the invention may comprise a Fresnel lens. Preferably, the measurement lens of the counting device according to the invention is a Fresnel lens.

The Fresnel lens may comprise a field angle greater than 6 degrees.

The measurement lens of the counting device according to the invention may comprise:
- a diameter greater than 5 millimetres and/or less than 25 millimetres, preferably equal to 12.7 millimetres, and/or
- a thickness greater than 0.1 millimetre and/or less than 4 millimetres, preferably equal to 1 millimetre.

The counting device according to the invention may comprise a measurement means recording and/or sensing said flux at at least one wavelength between 5 and 12 micrometres.

The wall of said counting device according to the invention may be formed by an assembly of a plurality of parts, preferably in two parts, arranged to be removably attached to each other.

The counting device according to the invention may comprise two windows each comprising germanium, preferably each being entirely comprised of germanium, the measurement lens being arranged to be positionable in front of, preferably centred on, either of the two windows in two reversible positions of the counting means in said device.

BRIEF DESCRIPTION OF THE FIGURES

Other advantages and features of the invention will become apparent from the detailed description of implementations and embodiments in no way limiting, and from the following appended drawings.

DETAILED DESCRIPTION

It is understood that the embodiments described in the following are by no means limiting. It is especially possible to imagine alternatives of the invention comprising only a selection of characteristics described hereinafter isolated from other characteristics described, if this selection of characteristics is sufficient to confer a technical advantage or to differentiate the invention from the state of prior art. This selection comprises at least one preferably functional characteristic without structural details, or with only part of the structural details if this part alone is sufficient to confer a technical advantage or to differentiate the invention from the state of prior art.

In particular, all of the described alternatives and embodiments can be combined with each other if there is nothing technically opposite to this combination.

In the figures, elements common to several figures retain the same reference.

Figure 1:
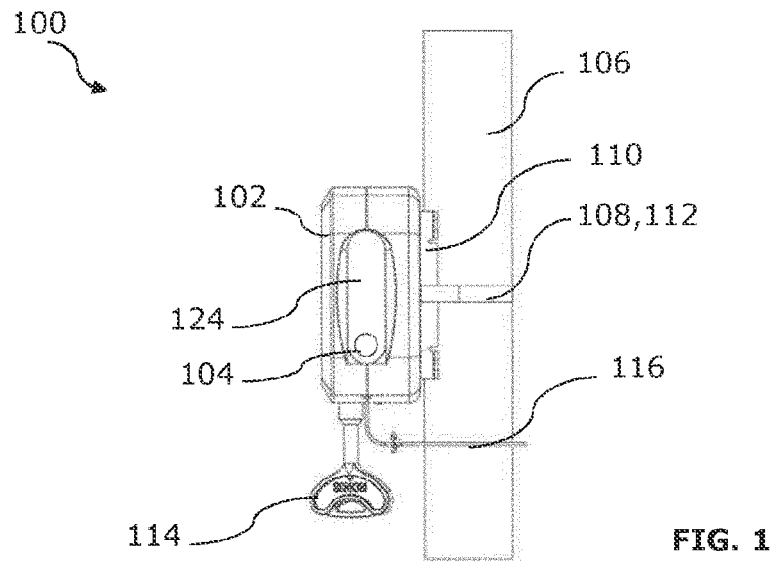
FIG. 1 is a schematic representation of a front view of a first non-limiting exemplary embodiment of a counting device 100 according to the invention.
Figure 2:
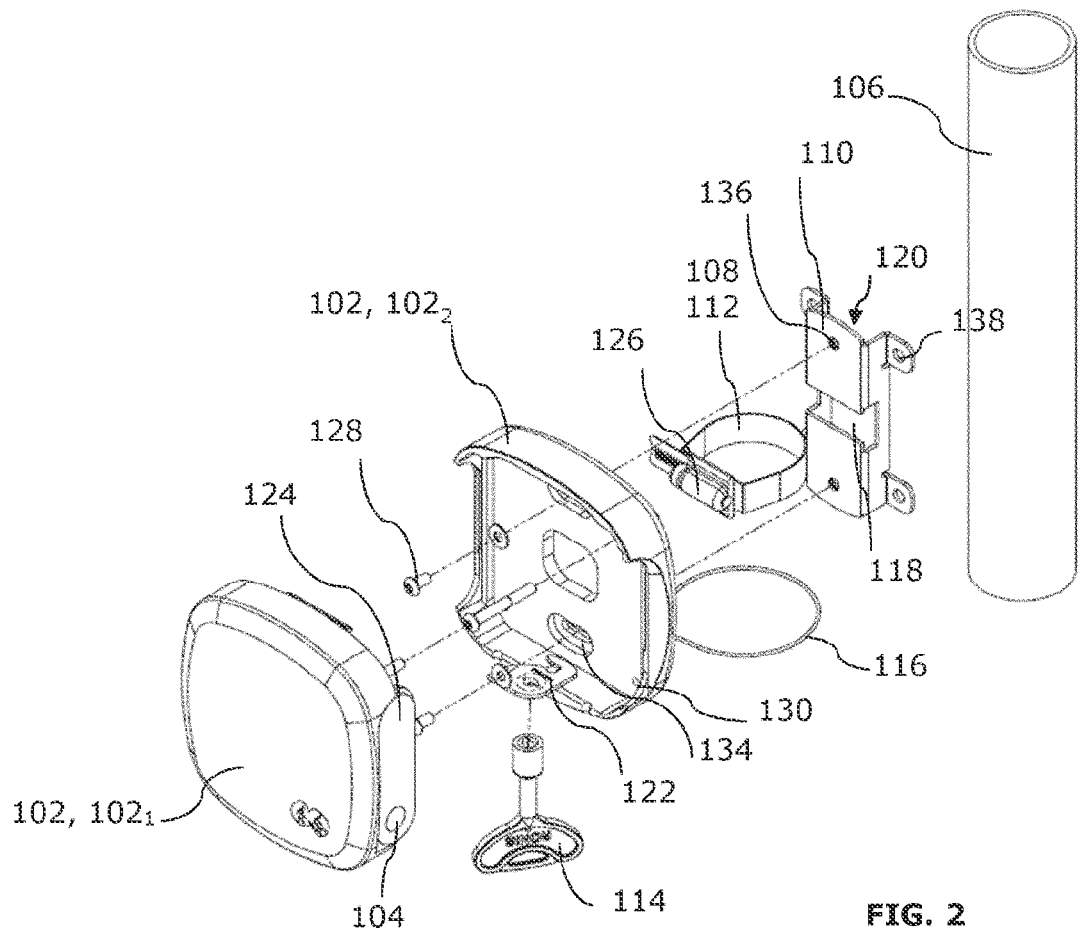
FIG. 2 is a schematic representation of a three-dimensional exploded view of the wall of the counting device 100 according to the first exemplary embodiment of the counting device according to the invention.
Figure 3:
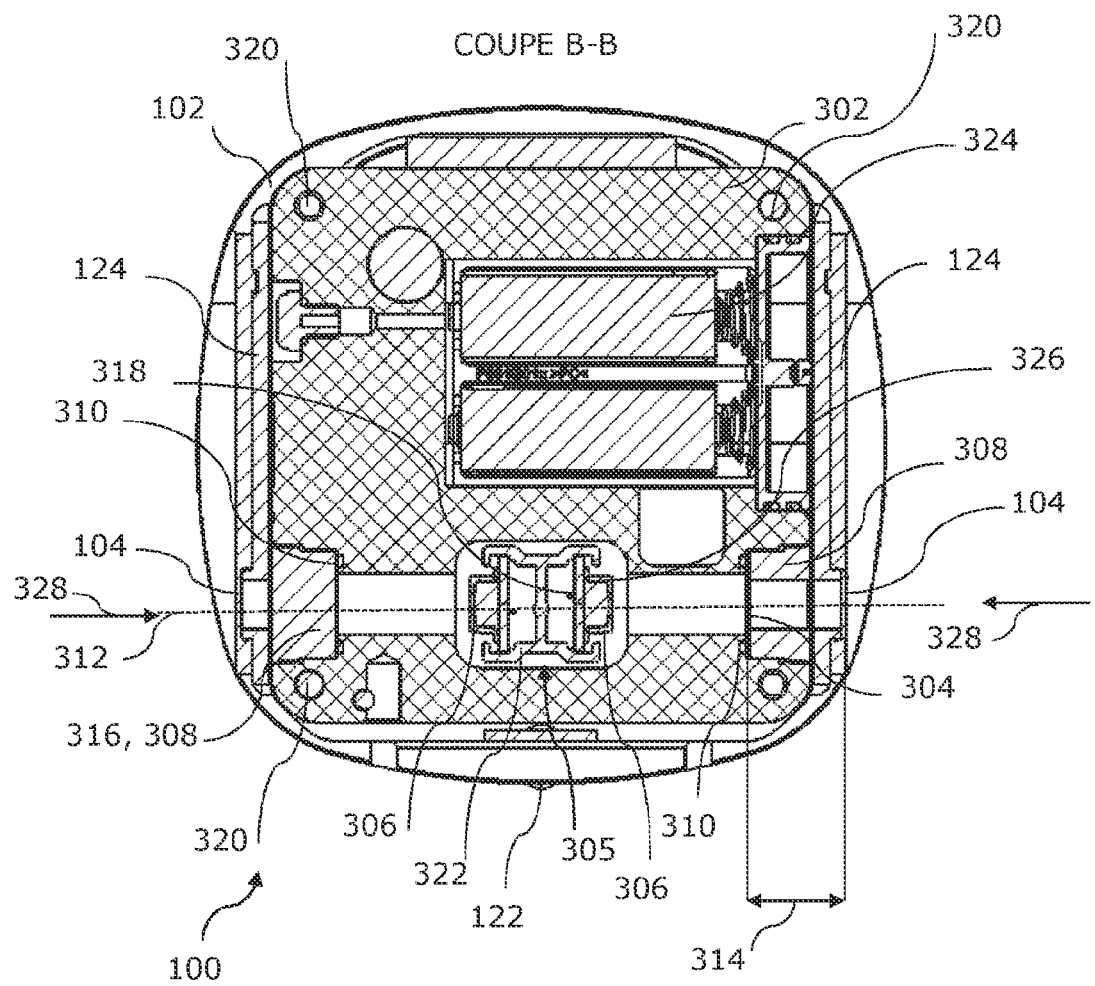
FIG. 3 is a profile cross-section view of the first non-limiting exemplary embodiment of the counting device 100 according to the invention.

FIGS. 1, 2 and 3 illustrate a first non-limiting exemplary embodiment of a counting device 100 according to the invention.

The counting device 100 illustrated in FIG. 1 comprises:
- a wall 102 delimiting an internal volume,
- a means for counting 302 (visible in FIG. 3 but absent from FIG. 2 so as not to overload this figure) objects positioned in said internal volume and comprising:
  - a measurement means 305 arranged to record and/or detect a flux (at least at a wavelength between 5 and 12 micrometres) emitted towards said counting means 302 by objects present in a detection zone, and
  - a measurement lens 304 (visible in FIG. 3) optically delimiting the detection zone outside said counting device 100.

By flux, it is meant a light flux or electromagnetic radiation.

The wall 102 of the counting device 100 comprises a window 104:
- comprising germanium, preferably being entirely comprised of germanium, and
- positioned in front of, in particular centred on, the measurement lens 304, so as to form a housing between the lens 304 and the window 104 (this housing being a closed space and preferably having the shape of a tube, the two ends of which are closed by the window 104 and by the lens 304 respectively).

The measurement lens 304 and said window 104 are arranged to transmit a flux emitted by objects present in said detection zone to said counting means 302.

In the remainder of the description, the tightness of a junction may be defined according to the CEI/IEC 60529: 1989+A1:1999 standard (edition 2.1 2:1989 consolidated by amendment 1:1999), by its IP degree of protection XY with X a natural number equal to 0, 1, 2, 3, 4, 5, or 6 and Y a natural number equal to 0, 1, 2, 3, 4, 5, 6, 7 or 8.

The lens 304 is assembled to the rest of the counting means 302 through a tight junction protecting the measurement means 305 from dust and/or moisture coming from outside of the counting means 302, this tight junction being a junction with a protection degree of IP XY (according to the CEI/IEC 60529:1989+A1:1999 standard mentioned above) with:
- X greater than or equal to 4, preferably greater than or equal to 5, preferably greater than or equal to 6,
- Y greater than or equal to 3, preferably greater than or equal to 4, preferably greater than or equal to 5, preferably greater than or equal to 6, preferably greater than or equal to 7, for example a tight junction with a degree of protection of IP 43 or IP 45 or preferably IP 67.

The window 104 is assembled to the rest of the wall 102 through a tight junction protecting the counting means 302 from dust and/or moisture coming from outside the wall 102, this tight junction being a junction with a degree of protection IP XY (according to the CEI/IEC 60529:1989+A1:1999 standard mentioned above) with:
- X greater than or equal to 4, preferably greater than or equal to 5, preferably greater than or equal to 6,
- Y greater than or equal to 3, preferably greater than or equal to 4, preferably greater than or equal to 5, preferably greater than or equal to 6, preferably greater than or equal to 7, for example a tight junction with a protection degree of IP 43 or IP 46.

Thus, the counting device 100 is a device 100 that provides the protective wall 102 to protect the counting means 302 from the environment external to said counting device 100.

The counting means 302 is therefore less prone to vandalism as it is protected by its protective shell, being the wall 102 of the counting device 100.

The wall also ensures tightness of the counting means 302. For example, the latter is protected by the wall 102 from moisture and/or insects that could lodge or lay eggs in the counting means 302.

In particular, the germanium window 104 has mechanical properties which enable the counting device 100 to guarantee it a high resistance to the external environment, such as that encountered in an urban environment, such as for example bad weather, temperature changes, mechanical shocks (less than or equal to 5 Joules (J) as defined by the electrical protection rating IK 08). Consequently, the counting device 100 according to the invention is more robust. Thus, the window 104 ensures robustness and mechanical protection of the counting means 302. The germanium window 104 provides additional protection to the measurement lens 304.

Furthermore, in addition to this high mechanical strength, germanium weakly attenuates the signal serving for measurement. Therefore, the arrangement of the counting device 100 allows it to be both resistant to its external environment and at the same time guarantees a sufficient signal level to achieve the necessary performance for counting objects.

By way of example, the germanium may be of a hardness equal to six Mohs.

The measurement lens 304 is an optical component, that is a refractive element. The focal length of the measurement lens 304 is greater than or equal to 18 millimetres (mm) and less than or equal to 30 millimetres.

The counting device 100 optionally comprises hooking means 108 arranged to attach the wall 102 to a support 106.

The support 106 illustrated in FIG. 1 is an urban post 106 to which the counting device 100 is hooked. In one alternative, not illustrated, the support 106 may also be a traffic sign, an advertising sign or a billboard. The support 106 may be the part concerned with the post or the panel part (i.e. support) attached to the post. Therefore, the counting device 100 may be directly positioned on different pre-existing urban elements. The counting device 100 can therefore be easily positioned in the urban environment.

In a non-limiting manner, the hooking means 108 illustrated in FIGS. 1, 2 and 3 comprise:
an attachment support 110 arranged to be in contact with the support 106, in particular the urban post 106, and
a clamp 112 for clamping said attachment support 110 to the urban post 106.

In particular, the attachment support 110 illustrated in FIG. 2 comprises, in its centre, an opening 118 arranged to accommodate a portion of the clamp 112. The part of the clamp 112 arranged to be positioned in the opening 118 comprises a clamping means 126. The clamping means 126 is arranged to adjust the diameter of the clamp 112 so that it holds the attachment support 110 against the post 106.

The attachment support 110 illustrated in FIGS. 1 and 2 comprises a central groove 120, raised, to a thickness of less than 10 centimetres and greater than 1 millimetre, along the entire length of the attachment support 110 so as to leave a small space available between the post 106 and said attachment support 110. This space especially allows the clamping means 126 of the clamp 112 to be inserted into the opening 118.

Preferably, the wall 102 of the counting device 100 illustrated in FIGS. 1, 2 and 3 is formed by an assembly of a plurality of parts arranged to be removably attached to each other.

The parts of the wall 102 may be attached by interlocking and/or with attachment means.

In a non-limiting manner, the wall 102 of the counting device 100 illustrated in FIG. 2 comprises two parts $102_1$ and $102_2$ attached to each other by interlocking so as to form the internal volume of the wall 102.

In this way, the wall 102 of the counting device 100 is dismountable, which allows simplified access to the counting means 302. For example, in the event of a malfunction of the counting means 302, an operator can come on site to retrieve the counting means 302 without dismounting the entire counting device 100.

However, access to the counting means 100 is limited.

A key 114 is illustrated in FIGS. 1 and 2. The key 114 is removably mounted in a locking latch 122 of the counting device 100.

The locking latch 122 is arranged to block access to the counting means 302. In particular, the locking latch 122 locks the interlocking of the two parts $102_1$ and $102_2$ of the wall 102. The locking latch 122 is arranged to be opened only by the key 114. Therefore, the wall 102 of the counting device 100 can only be opened and/or dismounted by the key 114.

One of the parts $102_2$ of the wall 102 contacts the attachment support 110 and the clamp 112. This part $102_2$ of the wall 102 comprises a first set of holes 134 arranged to receive a first attachment means 128 to attach a part $102_2$ of the wall 102 to the attachment support 110. In particular, the first set of holes 134 comprises, but is not limited to, two holes 134 positioned at the part of the wall 102 in contact with the attachment support.

The first attachment means 128 comprises at least one screw 128 and a washer, preferably two screws 128 and two washers, each of the screws being arranged to be screwed into a second set of holes 136 of the attachment support 110.

The part $102_2$ of the wall 102 in contact with the attachment support 110 comprises a third set of holes 130 arranged to accommodate a second attachment means (not illustrated) for attaching the wall to the post 106. The second attachment preferably comprises screws.

The attachment support comprises a fourth set of holes 138 arranged to attach the attachment support 110 to the post 106. The fourth set of holes 138 comprises, in a non-limiting way, four holes 138.

In a non-limiting way, the third set of holes 130 comprises four holes positioned on the part $102_2$ of the wall 102, the part $102_2$ of the wall 102 thus comprising four attachment means. These third holes 130 are preferably positioned at opposite ends on the wall 102. In this way, this allows for easy adjustment of the position of the counting device 100 while ensuring a high degree of attachment of the counting device 100 to the post 106. Thus, the counting device 100 illustrated in FIGS. 1, 2 and 3 comprises three holding means:
the clamp 112 for holding the attachment support 110 to the post 106,
the first attachment means 128 for attaching the wall 102 to the attachment support 110, and
the second attachment means for directly attaching the wall 102 to the post 106.

In one alternative, the counting device 100 illustrated in FIG. 1 also comprises an anti-theft device 116 of the counting means 302. The anti-theft device 116 is arranged to attach the counting means 302 to the post 106 and/or attach the counting means 302 to the wall 102.

In a non-limiting way and as illustrated in FIG. 1, the anti-theft device 116 links both the counting means 302 to the post 106 and the counting means 302 to the wall 112.

The anti-theft device 116 is preferably a cable or chain anti-theft device 116 that clamps the counting means 302 to the post 106 and to the wall 102.

The anti-theft device 116 may be of metal, for example of stainless steel or aluminium to prevent rusting phenomenon.

Optionally, the counting means 302 comprises a fifth set of holes 320. In particular, the fifth set of holes 320 comprises, in a non-limiting manner, four holes 320, each preferably coaxial with:
- a hole 130 of the third set of holes 130 of the part $102_2$ of the wall 102 in contact with the attachment support 110, and with
- a hole 138 of the fourth set of holes 138 of the attachment support 110.

In this way, the second attachment means can simultaneously be inserted into the counting means 302, the wall 102, the attachment support 110 and the post 106. This therefore allows the counting means 302 to be stably positioned in the internal volume of the wall 102 and also the attachment of the counting device 100 to the post 106 to be improved. The attachment of the counting device 100 is therefore even more robust and efficient.

When the counting means 302 is positioned in the internal volume of the wall 102, the parts $102_1$, $102_2$ of the wall 102 are assembled by interlocking.

Preferably, the parts of the wall 102 are locked by the key 114 which operates the locking latch 122 of the parts of the wall 102. Preferably, the locking latch acts as a lock, that is as a closure device that can only be opened by the key 114. Therefore, the combination of the key 114 and the locking latch 122 can limit, especially prevent, unauthorised access to the counting means 302 and/or the parts $102_1$, $102_2$ of the wall 102.

The wall 102 may be made from metal and/or plastic and/or natural material, for example wood. In the case illustrated in FIGS. 1, 2 and 3, the wall 102 is of plastic. The wall 102 illustrated in FIGS. 1, 2 and 3 comprises a thickness of more than 1 millimetre and less than 100 millimetres, for example, it is 5 millimetres in FIGS. 1, 2 and 3.

FIG. 3 is a cross-sectional view of FIG. 1.

The counting device 100 of FIG. 3 illustrates the counting means 302 positioned within the internal volume of the wall 102 of the counting device 100.

The counting means 302 illustrated in FIG. 3 comprises a measurement lens 304.

In one alternative, the counting means 302 may comprise at least one measurement means 305 to record the flux so as to count the number of objects present in said detection zone and/or detect the sense of passage of said objects.

The measurement means 305 comprises at least one sensor 306. The at least one sensor 306 may be or may comprise at least one pyroelectric cell.

In a non-limiting way, the sensor 306 of the counting means 302 illustrated in FIG. 3 is an infrared sensor, in particular a passive infrared sensor. The sensor 306 of the counting device 100 is referred to as a passive sensor because no light flux is emitted by said counting device 100 and/or the counting means 302. Indeed, the sensor 306 is arranged to detect heat emitted by objects circulating in the detection zone. The sensor 306 may, for example, be an Excelitas sensor having reference PYQ2498.

The measurement lens 304 comprises germanium or polyethylene.

Therefore, the measurement lens 304 may be comprised of:
- the same material as the window 104 when the measurement lens 304 is made of germanium, or
- a different material than the window 104 when the measurement lens 304 is of polyethylene.

Therefore, the composition of the measurement lens 304 adapts to the environment in which the counting device 100 may be mounted.

The focal length of the measurement lens 304 is preferably 25 millimetres when the measurement lens 304 comprises germanium. The focal length of the measurement lens 304 is preferably 23 millimetres, when the measurement lens 304 comprises polyethylene.

The measurement lens 304 made of polyethylene or germanium improves focus, especially concentration, of the flux onto the sensor 306.

The measurement lens 304 illustrated in FIG. 3 comprises a Fresnel lens 304. The measurement lens 304 illustrated in FIG. 3 is especially a germanium Fresnel lens.

The measurement lens 304, being a Fresnel lens, may be arranged to comprise a field angle greater than:
- 20 degrees (°), preferably equal to 30 degrees, when the measurement lens 304 is of polyethylene, or
- 7 degrees, preferably equal to 15 degrees, when the measurement lens 304 is of germanium.

The measurement lens 304 may therefore comprise a field angle depending on the material of the measurement lens.

In the case illustrated in FIGS. 1, 2 and 3, the measurement lens 304 is of germanium. The field angle of the measurement lens 304 is especially greater than 7° and less than 75°. In the illustrated case, the field angle of the Fresnel lens is 15°.

The measurement lens 304 preferably comprises:
- a diameter greater than 5 millimetres and/or less than 25 millimetres, preferably equal to 12.7 millimetres, and/or
- a thickness greater than 0.1 millimetre and/or less than 4 millimetres, preferably equal to 1 millimetre.

In the case illustrated in FIG. 3, the measurement lens 304 has a diameter of 12.7 millimetres and a thickness of 1 millimetre.

The measurement lens 304 comprises two dioptres. A first dioptre is oriented to the sensor 306 and a second dioptre is positioned on a side of the window 104 facing outwardly of said counting device 100.

Optionally, the window 104 may be a lens 104, that is a refractive element. In this case, the counting device 100 may comprise at least two lenses:
- the measurement lens 304, and
- the lens 104 associated with the window 104.

The window 104 may in this case have the same focal length as the measurement lens 304 or a different focal length. For example, the focal length of the window 104 may be 20 millimetres.

In the case illustrated in FIGS. 1, 2 and 3, the window 104 is not an optical lens, but a layer, preferably glazed, allowing the flux to pass therethrough so that it reaches the measurement lens 304. In this case, the window 104 transmits the flux.

In one alternative, the window 104 of the counting device 100 comprises a protective coating positioned on the side of the window 104 facing outwardly of said counting device 100. In particular, this side is visible on the face of the counting device 100 illustrated in FIG. 1. The protective coating thus makes it possible to protect the window 104 from light, especially solar, radiation.

This protective coating may comprise a carbonaceous material, preferably Diamond Like Carbon (DLC).

Thus, the protective coating is positioned on the second dioptre of the measurement lens 304.

For example, the protective coating of the window 104 illustrated in FIGS. 1, 2 and 3, is diamond like carbon, for example with reference MIL-C-675C or MIL-M-13508C or MIL-STD-810E.

The measurement lens 304 optionally includes an anti-reflective treatment on the first dioptre S1.

Preferably, the measurement lens 304 is a plano-convex lens. Thus, in this configuration, the first dioptre may be convex in shape and the second dioptre may be planar in shape.

Optionally, the protective coating may comprise a thickness of less than 14 micrometres (μm), preferably between 8 and 12 micrometres.

In a first alternative, the transmission factor of the protective coating on the second dioptre may be greater than 85%, preferably greater than 87% when the protective coating is between 8 and 12 micrometres.

In a second alternative, the transmission factor of the protective coating on the second dioptre may be greater than 75%, preferably greater than 80% when the protective coating is between 11 and 12 micrometres.

The window 104 illustrated in FIGS. 1, 2 and 3, preferably comprises, along the direction of propagation 328 of said flux on the optical axis 312 between the window 104 and the measurement lens 304, a thickness greater than 1 millimetre and/or less than 25 millimetres.

In particular, the window 104 of the device 100 illustrated in FIGS. 1, 2 and 3 has a thickness of 1 millimetre.

The thickness of the window ensures that the counting device 100, in particular the measurement lens 304, is effectively protected against mechanical impacts.

The counting device 100 comprises a gap 314, in the direction of propagation 328 of said flux on the optical axis 312 between the window 104 and the measurement lens 304, of at least 5 millimetres between the optical centre of the measurement lens 304 and the window 104 positioned in front of said measurement lens 304.

In particular, the gap 314 illustrated in FIG. 1 is of 20 millimetres.

In this way, the measurement lens 304 is positioned in proximity to the window 104, thereby maximising the detection zone size.

The gap 314 allows the measurement lens 304 to be shielded from, for example, sunlight, as the lens is not directly positioned behind the window 104. Furthermore, the gap 314 is the space required between the measurement lens 314 and the window 104 to optimise sensing of the flux by the measurement lens 304, that is to obtain the best possible focusing of the flux by the measurement lens 304.

Preferably, the window 104 facing the measurement lens 304 is centred on the measurement lens 304 so that the entire surface of the measurement lens 304 is protected and/or covered by the window 104.

The measurement lens 304 of the counting device 100 is positioned at a distance from the ground surface greater than 500 millimetres and/or less than 1000 millimetres, preferably between 700 and 850 millimetres.

In the case illustrated in FIGS. 1, 2 and 3, the measurement lens 302, in particular its optical centre (not illustrated), is positioned 850 millimetres plus or minus 10 millimetres from the ground surface.

The counting device 100 is also arranged to detect the sense of passage of objects circulating in the detection zone.

The flux sensed and recorded by the sensor 306 comprises a wavelength between 5 and 12 micrometres.

Thus, the counting device 100 is arranged to detect any object present in its detection zone producing heat radiation between 5 and 12 micrometres.

Thus, objects that can be detected by the counting device 100 are, for example, moving or static people, animals, bicycles, motorbikes.

The measurement means 305 of the counting device 100 comprises a range of less than 20 metres, preferably being 1 metre or 4 metres or 15 metres.

By range, it is meant the visual range corresponding to the maximum distance up to which the sensor 306 of the measurement means 305 can detect objects. Especially, the visual range of the sensor 306 is estimated along an axis perpendicular to its light-sensitive surface of the sensor 306 and extending from this surface until the sensor 306 can no longer distinguish an object.

In a non-limiting manner, the measurement means 305 of the counting device 100 comprises three series of range, for example 1 metre or 4 metres or 15 metres, depending on the characteristics of the sensor 306 used.

Thus, the counting means 302 may comprise sensors with different (detection) sensitivities.

The detection zone of the counting device 100 thus depends on the range of the sensor 306 and also on the optical characteristics of the measurement lens 304, such as its focal length, its field.

The counting means 302, especially the measurement means 305, optionally comprises a sensor card 318 on which the sensor 306 is positioned and a card support 322 for holding the sensor card 318 in the measurement means 305. The sensor board 318 comprises an electronic board and elements necessary for conditioning the signal from the sensor 306.

In one alternative, illustrated in FIG. 3, the sensor 306 may comprise two separate sensing zones. One of these two zones may, for example, be shuttered by a pixel mask 326 positioned upstream or on one of the sensing zones of said sensor 306. Thus, the counting means 302 comprises or consists of elements serving to count living beings or objects and/or determine their sense of passage as described in application FR2899003A1.

Optionally, the counting means 302 comprises means for holding the measurement lens 304.

In this case, the measurement lens 304 of the counting device 100 is held in a means for holding the counting means 302. The holding means comprises at least a first flange 308 which is preferably in contact with the window 104. Thus, such a flange makes it possible to improve tightness of the counting device 100. The counting means holding means 302 also comprises a seal 310 arranged to ensure tightness, for example by axial compression, of the measurement lens 304 in the first flange 308. For example, the combination of the seal 310 and the first flange 308 is arranged to block water intrusion into the internal volume of the wall 102, especially at the measurement lens 304. The first flange 308 allows the measurement lens 304 to be simply mounted in the counting means 302.

Thus, the wall 102 of the counting device 100 is a first, hermetically sealed protection, which is tight and protects against external aggressions such as shocks and/or insects. Furthermore, the counting device 100 is arranged so that the counting means 302, especially the perimeter of the counting means 302 provides the function of a second protective shell for the measurement lens 304 and/or the measurement means 305. For example, if the wall 102 of the counting device 100 were to be damaged, the counting means 302 would still remain protected by its perimeter. In particular, the perimeter of the counting means 302 forms a tight shell. The counting means 302 is therefore tight. The perimeter of the counting means 302 is greater than 1 millimetre and less than 25 millimetres. The perimeter of the counting means 302 comprises, by way of example, a thickness of 4 millimetres.

The counting means 302 illustrated in FIG. 3 includes, but is not limited to, a power supply 324. The power supply may be a rechargeable battery or cells. Of course, in one alternative not illustrated, the counting means may be autonomous, for example based on an electromagnetic power supply with the use of inductance.

In one alternative, the counting device 100 comprises two windows 104 each comprising germanium. In this case, each of the windows 104 is entirely comprised of germanium. The measurement lens 304 is arranged to be positionable in front of, especially centred on, either of the two windows 104 in two reversible positions of the counting means 302 in the counting device 302. Therefore, if the counting device 302 comprises only a measurement lens 304, the counting means 302 can be inserted into the internal volume of the wall 102 in two senses. This makes insertion of the counting means 302 easier and faster, and an operator mounting the counting means 302 in the wall 102 can easily change the orientation thereof without touching the hooking means 108 such as the clamp 112.

The counting device 100 illustrated in FIGS. 1, 2 and 3 comprises the two germanium windows 104 positioned on opposite sides to said counting device 100.

In a non-limiting way, the counting means 302, especially the measurement means 305, illustrated in FIG. 3 also comprises two sensors 306 and a single measurement lens 304 facing one side of the counting means 302.

On the side where the counting means 302 does not comprise a measurement lens 304, the counting means 302 may comprise a cover 316. This cover 316 shutters the flux passage to the measurement means 305, in particular the sensor 306, so as to protect it from light (Infrared, Ultra-Violet, Visible) radiation which could damage it. The cover 316 is preferably positioned at the location of the measurement lens 304. The cover 316 may also be held in the first flange 308 of the lens. The cover 316 may include a portion that is interlocked into the first flange 308 to shutter passage of light beams and/or flux into the first flange 308 so as to protect the sensor 306 from light radiation. In the case illustrated in FIG. 3, the cover 316 and the first flange 308 form on and a single piece. The first flange 308 also includes the seal 310 which is this time directly compressed against the first flange 308 as there is no measurement lens 304 positioned between the seal 310 and the flange 308.

In one alternative not illustrated, the counting means 302 may comprise two measurement lenses 304. In this case, the two measurement lenses 304 are preferably positioned on opposite sides of said counting means 302, so as to detect objects in two different directions. The two windows 104 are each positioned in front of, preferably centred on, one of the two measurement lenses 304. In this alternative not illustrated, the counting means does not comprise a cover 316 as described above. Each of the two measurement lenses 304 may be centred on the corresponding sensor 306 and, preferably, held in the first flange as described in the case where the counting means 302 comprises a single window 104 and a measurement lens 304. The two measurement lenses 304 may be centred on the same optical axis 312.

Thus, the counting means 302 may comprise as many sensors 306 as measurement lenses 304. The counting means 302 may comprise as many sensor cards 318 and/or pixel covers 326 and/or card supports 322 as measurement lenses 304. Preferably, when the counting means 302 comprises two measurement lenses 304, the counting means 302 comprises two sensors 306 each being arranged to sense the flux back from one of the measurement lenses 304. Similarly, the counting means 302 may comprise two sensor cards 318 and two pixel covers 326 and two card supports 322. In the case illustrated in FIG. 3, the counting means comprises one and a single card support 322 for two different sensor cards 318.

Optionally, the counting means comprises two pixel covers 326, two sensor cards 318 and a single card support 322.

Thus, the counting means can be arranged to comprise dual elements for recording the light flux in both directions, even if only one side of detection is possible (in case a cover 316 shutters a sensor 306).

The arrangement of the measurement means 305 is uniformly arranged for detection of objects in one direction and/or one sense or in two different directions and/or senses.

The counting device 100 illustrated in FIGS. 1, 2 and 3 comprises a smooth external surface without discontinuity between the window 104 and its perimeter 124 formed in said wall 102, so that the window 104 is not depressed inwardly of the device 100 relative to an external surface of the wall 102.

Such an arrangement limits the presence of housings in which, for example, insects could be housed or snow could stagnate, or people could leave waste such as chewing gum.

The perimeter 124 of the germanium window 104 is like a second flange 124. The germanium window 104 and the perimeter 124 are smooth and flush with each other. There are no protrusions from one to the other. The perimeter 124 is, for example, of plastic or wood. Therefore, only the window 104 is made of an expensive material in order to guarantee effective protection for the measurement lens 302.

As illustrated in FIGS. 1, 2 and 3, the optical axis 312 of the measurement lens 304 is parallel to the ground surface to within 5 degrees.

Further, the optical axis 312 of the measurement lens 304 is orthogonal, to within 5 degrees, to the direction of movement of said objects circulating in the detection zone. In this way, the flux detection by the sensor 306 is more accurate.

The counting device 100 may optionally comprise communication (wired or wireless) means (not illustrated) arranged to communicate data and/or receive data with a control device (not illustrated) positioned outside said device 100 and/or inside said device 100.

The communication means may be arranged to communicate data from one or more detected objects in the detection zone to an information collector box, which may communicate with a long range computer network to transmit to it the passage data (including, for example, count and sense) of the one or more objects detected, for example by radio cellular communication using, for example, a modem or a SIM card.

The set of data thus collected may thus be transmitted and thus used by one or more users for different purposes, such as, for example, displaying data on a board, remotely monitoring the information collected, etc.

The counting device 100 may comprise a 3G and/or 4G communication module and/or a Bluetooth link comprising a SIM card arranged to send the data collected, for example, the count and/or the sense of passage of objects to a server on the internet.

In this way, the data collected can be utilised and presented to users of the counting device 100.

The data collected may, for example, be sent automatically or after the counting device 100 receives a command from a user via the internet server.

The frequency of sending can be daily, monthly, yearly or hourly.

Figure 4:
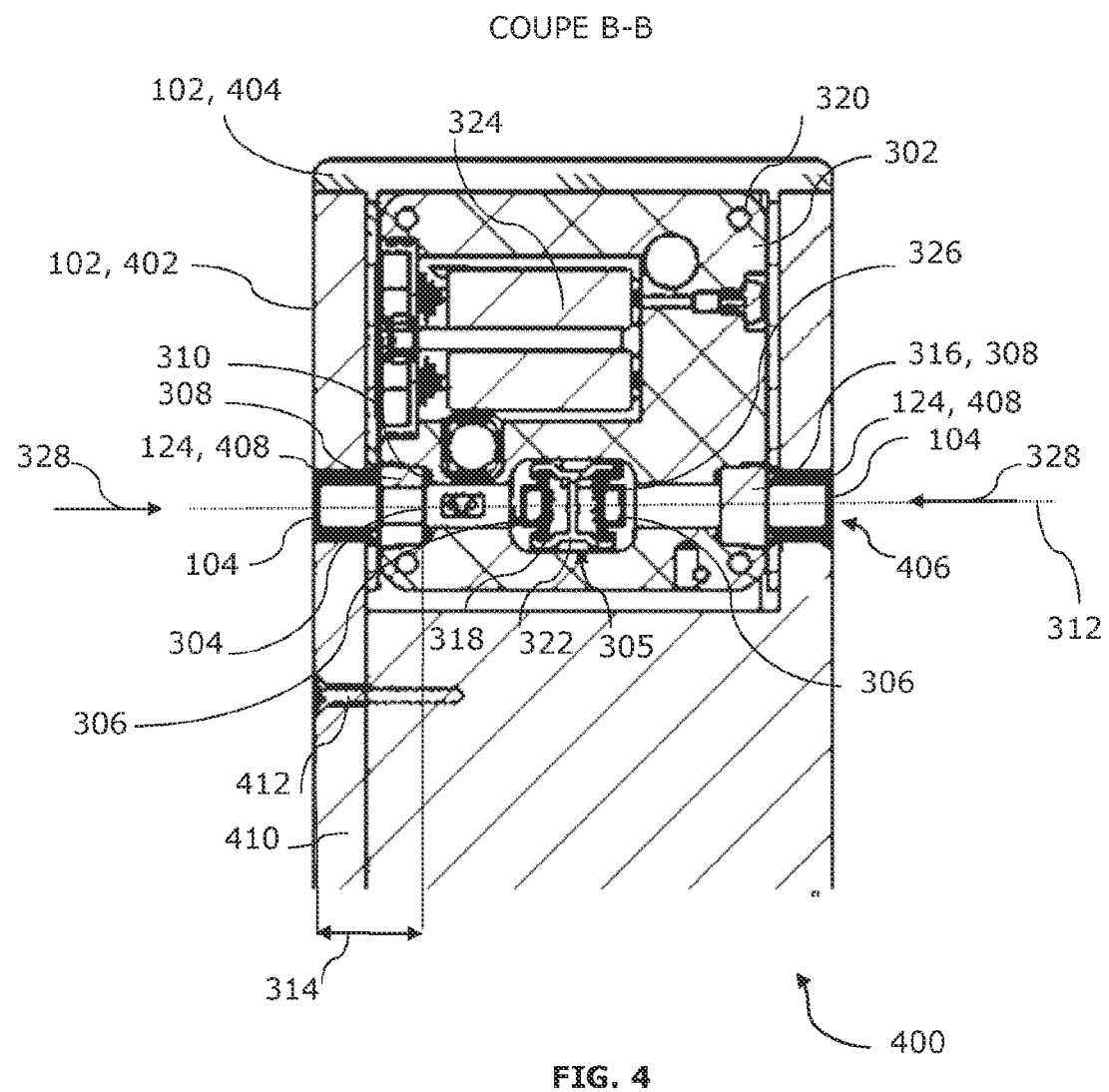
FIG. 4 is a profile cross-section view of a second non-limiting exemplary embodiment of a counting device 400 according to the invention.

FIG. 4 illustrates a second example of a counting device 400 according to the invention.

The counting device 400 illustrated in FIG. 4 comprises the same elements as the counting device 100 illustrated in FIGS. 1, 2 and 3. Thus, only the differences with the device 100 illustrated in FIGS. 1, 2 and 3 will be described.

The counting device 400 illustrated in FIG. 4 does not include the hooking means 108 as illustrated in FIGS. 1, 2 and 3.

Indeed, in the case of FIG. 4, the wall 102 of the counting device 400 forms a post connected to a ground carrying said device 400. Thus, the counting device 100 forms one and a single unit.

Thus, the counting device 400 is directly the urban element. The counting device 400 is therefore more discreet in the urban environment, such as in a street or a square. It blends directly into the urban environment. Therefore, the counting device 400 is less prone to vandalism.

In the case of FIG. 4, the wall 102 of the counting device 400 is comprised of two removably attached parts. A first part corresponds to a hatch 402 and comprises an internal volume in which the counting means 302 is positioned. The hatch 402 forms the side edges of the post. A second part corresponds to a support cover 404 and forms the upper surface of the post.

The support cover 404 of the wall 102 is arranged to fit and/or interlock into the hatch 402 of the wall 102.

The device wall 400 also includes a removable side edge 410. In particular, the removable side edge 410 is a part of the hatch 402. The removable side edge 410 is attached to the other parts of the wall 102 (especially the other parts of the hatch 402) by third attachment means 412. The third attachment means 412 comprise at least one screw 412. In the case illustrated in FIG. 4, the third attachment means comprise 2 screws.

In a non-limiting way, the counting device 400 illustrated in FIG. 4 is rectangular in shape. Of course, in other alternatives not illustrated, the counting device 400 may be cylindrical, square, circular, conical, potato-like shaped, etc.

The wall 102 of the counting device is preferably smooth and without discontinuity between the window 104 and the wall 102. In particular, all the external surfaces forming the wall 102 (hatch 402 and support 404) are smooth and without material discontinuity, especially without protrusion.

Such an arrangement makes it possible to limit presence of housings in which, for example, insects could be housed or snow could stagnate, or people could leave waste such as chewing gum.

Especially, the counting means 302 is more difficult to access by objects or persons circulating in the urban environment.

The counting device 400 also comprises two germanium windows 104 positioned on side edges opposite to the wall 102, especially to the hatch 402.

The counting device 400 illustrated in FIG. 4 and similarly to the counting device 100 illustrated in FIG. 3, comprises a single measurement lens 304. Further, the measurement means 305 comprises a card support 322 for positioning and holding two sensor cards 318 and two sensors 306 sensing flux in two different directions 328 and/or senses.

The internal volume of the wall 102, especially of the hatch is of the same volume as the counting means 302 or of a slightly larger volume (that is less than 30 percent of the volume of the counting means 302).

In a first alternative, the wall 102 of the counting device 400 may be formed from a wood and/or plastic assembly. In a second alternative, the wall 102 of the counting device 400 may be formed from an assembly of recycled plastic and/or plastic. Accordingly, the counting device 400 may be, but is not limited to, comprised of all-natural materials and/or from recycled materials and/or from materials commonly found in commerce. Such a composition of the counting device 400 ensures robustness, measurement quality, protection of the counting means 302 and adapts to ecological requirements and/or urban aesthetics.

Optionally, the counting means 302 is held in the internal volume of the hatch 402 by the support cover 404. Especially, the counting means 302 is embedded in the support cover 404 to be held in the internal volume of the wall 102, especially in the internal volume of the cavity 402.

The perimeter 124 of the window 104 illustrated in FIG. 4 is in the form of a second flange 408 of the window 104 to hold the window 104 in the counting device 400. In particular, the second flange 408 is arranged to serve as an interface between the first flange 308 and the window 104.

The wall 102, especially the hatch 402, comprises at least one opening 406 positioned on a lateral end of the wall 102. The opening is arranged to accommodate the perimeter 124 of the window 104. The window 104 is positioned flush with the opening 406 opening outwardly of the device 400. The second flange 408 is positioned in the opening 406. In this manner, the arrangement of the second flange 408 in the opening 406 comprises a holding function that ensures that the device 400 is held in the wall 402.

In a non-limiting way, the counting device 400 comprises two openings 406 positioned on two opposite side ends of the wall 102. Thus, the counting device is also held in the wall 102 with the second flanges 408 in the openings 406. Furthermore, such an arrangement ensures stability and horizontal position of the optical axis 312, especially the parallelism of the optical axis 312 with respect to a ground surface on which the post is attached.

Of course, the invention is not limited to the examples just described. Many modifications can be made to these examples without departing from the scope of the invention as described.

The invention claimed is:

1. A counting device comprising:
   a wall delimiting an internal volume,
   an object counter positioned in said internal volume, said counter comprising:
   a measurement element arranged to record and/or detect
      a flux at least one wavelength between 5 and 12 micrometers emitted towards said counter by objects present in a detection zone, and
   a measurement lens optically delimiting the detection zone outside said counter, the lens being assembled to the rest of the counter through a tight junction protecting the measurement element from dust and/or moisture coming from outside the counter, wherein the wall of the counting device comprises a window:
  comprising germanium, preferably being entirely comprised of germanium, and
  positioned in front of, preferably centred on, the measurement lens, so as to form a housing between the lens and the window
  assembled to the rest of the wall through a tight junction protecting the counter from dust and/or moisture coming from outside the wall,
said measurement lens and said window being arranged to transmit the flux emitted by objects present in said detection zone to said counter.

2. The counting device according to claim 1, further comprising: a smooth external surface with no discontinuity between the window and its perimeter formed in said wall, so that the window is not depressed inwardly of the device with respect to an external surface of the wall.

3. The counting device according to claim 1, wherein the measurement lens comprises germanium or polyethylene.

4. The counting device according to claim 1, wherein the window comprises a protective coating positioned on a side of the window facing outwardly of said counting device.

5. The counting device according to claim 1, wherein the protective coating comprises a carbonaceous material, preferably diamond like carbon.

6. The counting device according to claim 1, wherein the window has, along the direction of propagation of said flux on the optical axis between the window and the measurement lens, a thickness greater than 1 millimeter and/or less than 25 millimeters.

7. The counting device according to claim 1, wherein the housing forms a gap, in the direction of propagation of said flux on the optical axis between the window and the measurement lens, of at least 5 millimeters between the optical center of the measurement lens and the window positioned in front of said measurement lens.

8. The counting device according to claim 1, further comprising a hooking element arranged to attach the wall to a support.

9. The counting device according to claim 1, further comprising: a post connected to a ground carrying said counting device.

10. The counting device according to claim 1, wherein the measurement lens is positioned at a distance from the ground surface greater than 500 millimeters and/or less than 1000 millimeters, preferably between 700 and 850 millimeters.

11. The counting device according to claim 1, wherein the measurement lens is held in a holder holding the counter, said holder comprising at least a first flange which is in contact with said window.

12. The counting device according to claim 1, wherein the measurement lens comprises a Fresnel lens.

13. The counting device (100, 400) according claim 1, wherein the measurement lens (304) comprises:
  a diameter greater than 5 millimeters and/or less than 25 millimeters, preferably equal to 12.7 millimeters, and/or
  a thickness greater than 0.1 millimeters and/or less than 4 millimeters, preferably equal to 1 millimeter.

14. The counting device according to claim 1, wherein the wall of said device is formed by an assembly of several parts arranged to be removably attached to each other.

15. The counting device according to claim 1, further comprising: two windows each comprising germanium, preferably each being entirely comprised of germanium, the measurement lens being arranged to be positionable in front of, preferably centered on, either of the two windows in two reversible positions of the counter in said device.

* * * * *